US012555096B2

(12) United States Patent
Pene

(10) Patent No.: US 12,555,096 B2
(45) Date of Patent: Feb. 17, 2026

(54) AUTOMATICALLY PAIRING PHYSICAL ASSETS TO A NON-FUNGIBLE TOKEN OR DIGITAL ASSET

(71) Applicant: Declan Pene, Newport Coast, CA (US)

(72) Inventor: Declan Pene, Newport Coast, CA (US)

( * ) Notice: Subject to any disclaimer, the term of this patent is extended or adjusted under 35 U.S.C. 154(b) by 173 days.

(21) Appl. No.: 18/134,981

(22) Filed: Apr. 14, 2023

(65) Prior Publication Data

US 2023/0334472 A1    Oct. 19, 2023

Related U.S. Application Data

(60) Provisional application No. 63/331,065, filed on Apr. 14, 2022.

(51) Int. Cl.
| | | |
|---|---|---|
| G06Q 20/36 | (2012.01) | |
| G06Q 20/10 | (2012.01) | |
| G06Q 20/38 | (2012.01) | |
| G06Q 20/40 | (2012.01) | |

(52) U.S. Cl.
CPC ......... *G06Q 20/3672* (2013.01); *G06Q 20/10* (2013.01); *G06Q 20/3678* (2013.01); *G06Q 20/3825* (2013.01); *G06Q 20/389* (2013.01); *G06Q 20/4014* (2013.01)

(58) Field of Classification Search
None
See application file for complete search history.

(56) References Cited

U.S. PATENT DOCUMENTS

| | | |
|---|---|---|
| 10,373,129 B1 | 8/2019 | James et al. |
| 10,554,401 B1 | 2/2020 | Lee |
| 2019/0303926 A1 | 10/2019 | Yantis et al. |
| 2020/0210380 A1 | 7/2020 | Cage et al. |

(Continued)

FOREIGN PATENT DOCUMENTS

WO    WO 2023/201058    10/2023

OTHER PUBLICATIONS

Peter Cramer et al., "As NFTs Blur the Line Between "Receipt" and "Product", Trademarks Owners Fight Over New Virtual Markets", Apr. 12, 2022 (Year: 2022).*

(Continued)

*Primary Examiner* — Patrick Mcatee
*Assistant Examiner* — Timothy Paul Sax
(74) *Attorney, Agent, or Firm* — Polsinelli LLP

(57) ABSTRACT

Disclosed are systems and techniques for automatically pairing physical assets to a non-fungible token. For example, a process can include obtaining transaction information of a selected item associated with an online transaction between a user device and a provider system, the transaction information including a user identifier of a user of the user device. A digital wallet address of the user can be determined based on the user identifier, the digital wallet address associated with a digital wallet system. A non-fungible token (NFT) can be automatically generated based on the transaction information and in response to verifying the online transaction for the selected item. Information regarding the NFT can be provided to the digital wallet system in accordance with the digital wallet address associated with the user, wherein the digital wallet system updates information stored at the digital wallet address based on the information regarding the NFT.

20 Claims, 2 Drawing Sheets

(56) References Cited

U.S. PATENT DOCUMENTS

| | | | |
|---|---|---|---|
| 2021/0042748 A1* | 2/2021 | Sepulveda | H04L 9/0637 |
| 2021/0264444 A1 | 8/2021 | Chen et al. | |
| 2021/0279305 A1* | 9/2021 | Goldston | G06F 16/41 |
| 2022/0027992 A1 | 1/2022 | Blevins | |
| 2022/0358498 A1* | 11/2022 | Mullins | G06Q 20/401 |
| 2023/0079195 A1* | 3/2023 | Matheson | G06Q 20/0655 |
| | | | 705/44 |
| 2023/0162179 A1* | 5/2023 | Deng | G06Q 20/3823 |
| | | | 705/64 |
| 2023/0169578 A1* | 6/2023 | Krishna | G06Q 30/0625 |
| | | | 705/27.1 |
| 2023/0245062 A1* | 8/2023 | Silver | G06Q 10/087 |
| | | | 705/28 |
| 2023/0245218 A1* | 8/2023 | Simmons | G06Q 30/0641 |
| | | | 705/26.1 |
| 2023/0259936 A1* | 8/2023 | Roffey | G06Q 20/385 |
| | | | 705/69 |
| 2023/0325814 A1* | 10/2023 | Vijayan | G06Q 20/3829 |
| | | | 705/66 |

OTHER PUBLICATIONS

PCT Application No. PCT/US2023/018684, International Search Report and Written Opinion mailed Jul. 10, 2023.
PCT Application No. PCT/US2023/018684, International Preliminary Report on Patentability dated Oct. 25, 2024.

* cited by examiner

AUTOMATICALLY PAIRING PHYSICAL ASSETS TO A NON-FUNGIBLE TOKEN OR DIGITAL ASSET

CROSS-REFERENCE TO RELATED APPLICATIONS

This application claims the benefit of priority to U.S. Provisional Patent Application No. 63/331,065 filed Apr. 14, 2022 and entitled "AUTOMATICALLY PAIRING PHYSICAL ASSETS TO A NON-FUNGIBLE TOKEN OR DIGITAL ASSET," the disclosure of which is herein incorporated by reference in its entirety and for all purposes.

BACKGROUND OF THE INVENTION

Technical Field

The present disclosure generally relates to distributed ledgers such as blockchains. For example, aspects of the present disclosure are related to systems and techniques for generating non-fungible tokens (NFTs) that can be stored on a blockchain or other distributed ledger.

Description of the Related Art

A blockchain can be implemented as a peer-to-peer, decentralized and distributed electronic ledger. A blockchain can include a plurality of blocks that are cryptographically linked together. The blocks may contain one or more transactions or transaction records. Each transaction is a data structure that encodes the transfer of control of a digital asset between participants in the blockchain and includes at least one input and at least one output. Blocks may also contain additional information, such as a timestamp and transaction data.

Each block contains a hash (e.g., a cryptographic hash) of the previous block. As such, a series of blocks can be seen to form a chain, with each additional block reinforcing the preceding blocks. This chain of blocks, each containing transaction data and a hash of a previous block, is a blockchain. Blockchains can be used to create a permanent record of all transactions that have been written to the blockchain since its inception. The design of blockchains makes them resistant to the modification of transaction data, as any given block depends on all of the preceding blocks written to the blockchain before it. In other words, once a block is written to a blockchain, the data in that block cannot be retroactively altered without also altering all subsequent blocks.

For a transaction to be written to the blockchain, the transaction must be validated. Network nodes (also referred to as miners) perform work to ensure that each transaction is valid, with invalid transactions rejected from the network. For example, for a transaction to be written to the blockchain, the transaction may initially be validated by the first node that receives the transaction. If the transaction is validated, the node subsequently relays the transaction to the other nodes in the network. The transaction is then added to a new block (or is queued to be added to a new block). At some later point, the new block is then mined (e.g., by a miner) and added to the blockchain. In other words, mining a block adds the transactions included in the block to the blockchain's distributed ledger of past transactions.

In addition to implementing publicly distributed ledgers, blockchains may also be used to implement smart contracts. Smart contracts can be provided as computer programs designed to automate the execution of the terms of a machine-readable contract or agreement. For example, a smart contract can include machine executable rules for processing inputs and producing results as output, which can then cause actions to be performed based on the results. Smart contracts can be associated with transactions that involve the transfer of ownership rights and/or assets, both digital and real. Assets may include real property, personal property (including both tangible and intangible property), digital assets such as software, for example, or any other type of asset.

In some cases, tokens can be used to represent and transfer assets via the blockchain. A token serves as an identifier that allows an asset to be referenced from the blockchain. Like assets, tokens used to represent assets may have various properties, one of which is fungibility or non-fungibility. Fungibility can refer to the equivalence or interchangeability of each unit of a commodity with other units of the same commodity. Fungible tokens (FTs) are tokens that can be exchanged for any other token of the same type and the same value. Fungible tokens are uniform. In other words, FTs of the same type are identical in specification, such that each fungible token (FT) is identical to another FT of the same type. FTs can be divisible into smaller amounts (e.g., similar to currency, where bills can be divided into other bills or coins of an equivalent value). As such, a fraction of an FT can be transferred between users.

Non-fungible tokens (NFTs), however, cannot be replaced with other tokens of the same type, as NFTs represent non-fungible assets. Non-fungible assets, and therefore NFTs, may have unique information and/or attributes. Each NFT is unique and differs from other tokens of a same or similar class. In contrast to FTs, NFTs cannot be divided—the elementary unit of the NFT is the token itself.

BRIEF SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In one illustrative example, a method is provided. The method may include: obtaining transaction information of at least a first selected item associated with an online transaction between a user device and a provider system, wherein the transaction information includes at least a user identifier of a user of the user device and is obtained over a communication network; determining a digital wallet address associated with the user based at least in part on the user identifier, wherein the digital wallet address is associated with a digital wallet system identified from among a plurality of available digital wallet systems; automatically generating a non-fungible token (NFT) based on the transaction information, wherein the NFT is automatically generated in response to verifying the online transaction for the first selected item; and providing information regarding the NFT to the digital wallet system in accordance with the digital wallet address associated with the user, wherein the digital wallet system updates information stored at the digital wallet address based on the information regarding the NFT.

In some aspects, providing the information regarding the NFT to the digital wallet system comprises transmitting the NFT to the digital wallet address associated with the user, wherein information associated with transmitting the NFT to the digital wallet address is written to a blockchain associated with the digital wallet system.

In some aspects, determining the digital wallet address associated with the user comprises: determining that no digital wallet address is currently associated with the user, based at least in part on the user identifier; and in response to the determining, generating a digital wallet for the user, the generated digital wallet having the digital wallet address.

In some aspects, the method further comprises: prompting the user to provide a user input indicative of the digital wallet address associated with the user; and storing the digital wallet address in association with the user identifier.

In some aspects determining the digital wallet address associated with the user comprises: utilizing the user identifier as a query into a plurality of stored digital wallet addresses; and obtaining the digital wallet address associated to the user identifier query.

In some aspects, the online transaction is between the user device and a web2 e-commerce system or a web3 e-commerce system.

In some aspects, the first selected item associated with the online transaction is different from the automatically generated NFT.

In some aspects, verifying the online transaction for the first selected item includes: obtaining information indicative of a payment transmitted from the user device to the provider system; and based on the information indicative of the payment transmitted from the user device, confirming receipt of the transmitted payment by the provider system.

In some aspects, the information indicative of the payment is blockchain transaction information stored on a blockchain associated with the digital wallet system, and wherein the payment is a cryptocurrency payment transmitted from the digital wallet address associated with the user to a second digital wallet address associated with the provider system; and confirming receipt of the transmitted payment comprises determining that the blockchain transaction information has been confirmed on the blockchain.

In some aspects, the method further comprise: generating a smart contract on a blockchain associated with the digital wallet system, wherein the smart contract combines the transaction information of the first selected item of the online transaction with minting information for automatically generating the NFT based on the transaction information.

In some aspects, the smart contract links the first selected item with the automatically generated NFT.

In some aspects, generating the smart contract includes initializing the smart contract based on the digital wallet address associated with the user.

In some aspects, the method further comprises: obtaining a user input indicative of a cryptographic signature associated with the digital wallet address of the user, wherein the cryptographic signature corresponds to the user signing the smart contract; and automatically generating the NFT based on verifying the transaction information for the first selected item and based on verifying the cryptographic signature associated with the digital wallet address of the user.

In another illustrative example, an apparatus for is provided that includes at least one memory comprising instructions and at least one processor (e.g., configured in circuitry) configured to execute the instructions and cause the apparatus to: obtain transaction information of at least a first selected item associated with an online transaction between a user device and a provider system, wherein the transaction information includes at least a user identifier of a user of the user device and is obtained over a communication network; determine a digital wallet address associated with the user based at least in part on the user identifier, wherein the digital wallet address is associated with a digital wallet system identified from among a plurality of available digital wallet systems; automatically generate a non-fungible token (NFT) based on the transaction information, wherein the NFT is automatically generated in response to verifying the online transaction for the first selected item; and provide information regarding the NFT to the digital wallet system in accordance with the digital wallet address associated with the user, wherein the digital wallet system updates information stored at the digital wallet address based on the information regarding the NFT.

In some aspects, to provide the information regarding the NFT to the digital wallet system, the at least one processor is configured to: transmit the NFT to the digital wallet address associated with the user, wherein information associated with transmitting the NFT to the digital wallet address is written to a blockchain associated with the digital wallet system.

In some aspects, to determine the digital wallet address associated with the use, the at least one processor is configured to: determine that no digital wallet address is currently associated with the user, based at least in part on the user identifier; and generate a digital wallet for the user, the generated digital wallet having the digital wallet address.

In some aspects, the online transaction is between the user device and a web2 e-commerce system or a web3 e-commerce system; and the first selected item associated with the online transaction is different from the automatically generated NFT.

In some aspects, to verify the online transaction for the first selected item, the at least one processor is configured to: obtain information indicative of a payment transmitted from the user device to the provider system, wherein the information indicative of the payment is blockchain transaction information stored on a blockchain associated with the digital wallet system, and wherein the payment is a cryptocurrency payment transmitted from the digital wallet address associated with the user to a second digital wallet address associated with the provider system; and based on the information indicative of the payment transmitted from the user device, confirm receipt of the transmitted payment by the provider system based on determining that the blockchain transaction information has been confirmed on the blockchain.

In some aspects, the at least one processor is further configured to: generate a smart contract on a blockchain associated with the digital wallet system, wherein the smart contract combines the transaction information of the first selected item of the online transaction with minting information for automatically generating the NFT based on the transaction information, wherein the smart contract links the first selected item with the automatically generated NFT, and wherein, to generate the smart contract, the at least one processor is configured to initialize the smart contract based on the digital wallet address associated with the user.

In some aspects, the at least one processor is further configured to: obtain a user input indicative of a cryptographic signature associated with the digital wallet address of the user, wherein the cryptographic signature corresponds to the user signing the smart contract; and automatically generate the NFT based on verifying the transaction information for the first selected item and based on verifying the cryptographic signature associated with the digital wallet address of the user.

In another illustrative example, a non-transitory computer-readable medium is provided that includes stored thereon at least one instruction that, when executed by one or more processors, may cause the one or more processors to: obtain transaction information of at least a first selected item associated with an online transaction between a user device and a provider system, wherein the transaction information includes at least a user identifier of a user of the user device and is obtained over a communication network; determine a digital wallet address associated with the user based at least in part on the user identifier, wherein the digital wallet address is associated with a digital wallet system identified from among a plurality of available digital wallet systems; automatically generate a non-fungible token (NFT) based on the transaction information, wherein the NFT is automatically generated in response to verifying the online transaction for the first selected item; and provide information regarding the NFT to the digital wallet system in accordance with the digital wallet address associated with the user, wherein the digital wallet system updates information stored at the digital wallet address based on the information regarding the NFT.

In another illustrative example, an apparatus is provided. The apparatus may include: means for obtaining transaction information of at least a first selected item associated with an online transaction between a user device and a provider system, wherein the transaction information includes at least a user identifier of a user of the user device and is obtained over a communication network; means for determining a digital wallet address associated with the user based at least in part on the user identifier, wherein the digital wallet address is associated with a digital wallet system identified from among a plurality of available digital wallet systems; means for automatically generating a non-fungible token (NFT) based on the transaction information, wherein the NFT is automatically generated in response to verifying the online transaction for the first selected item; and means for providing information regarding the NFT to the digital wallet system in accordance with the digital wallet address associated with the user, wherein the digital wallet system updates information stored at the digital wallet address based on the information regarding the NFT.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope (nor necessarily to be considered as drawn to scale), the principles herein are described and explained with additional specificity and detail through the use of the accompanying drawings in which.

DETAILED DESCRIPTION

Figure 1:
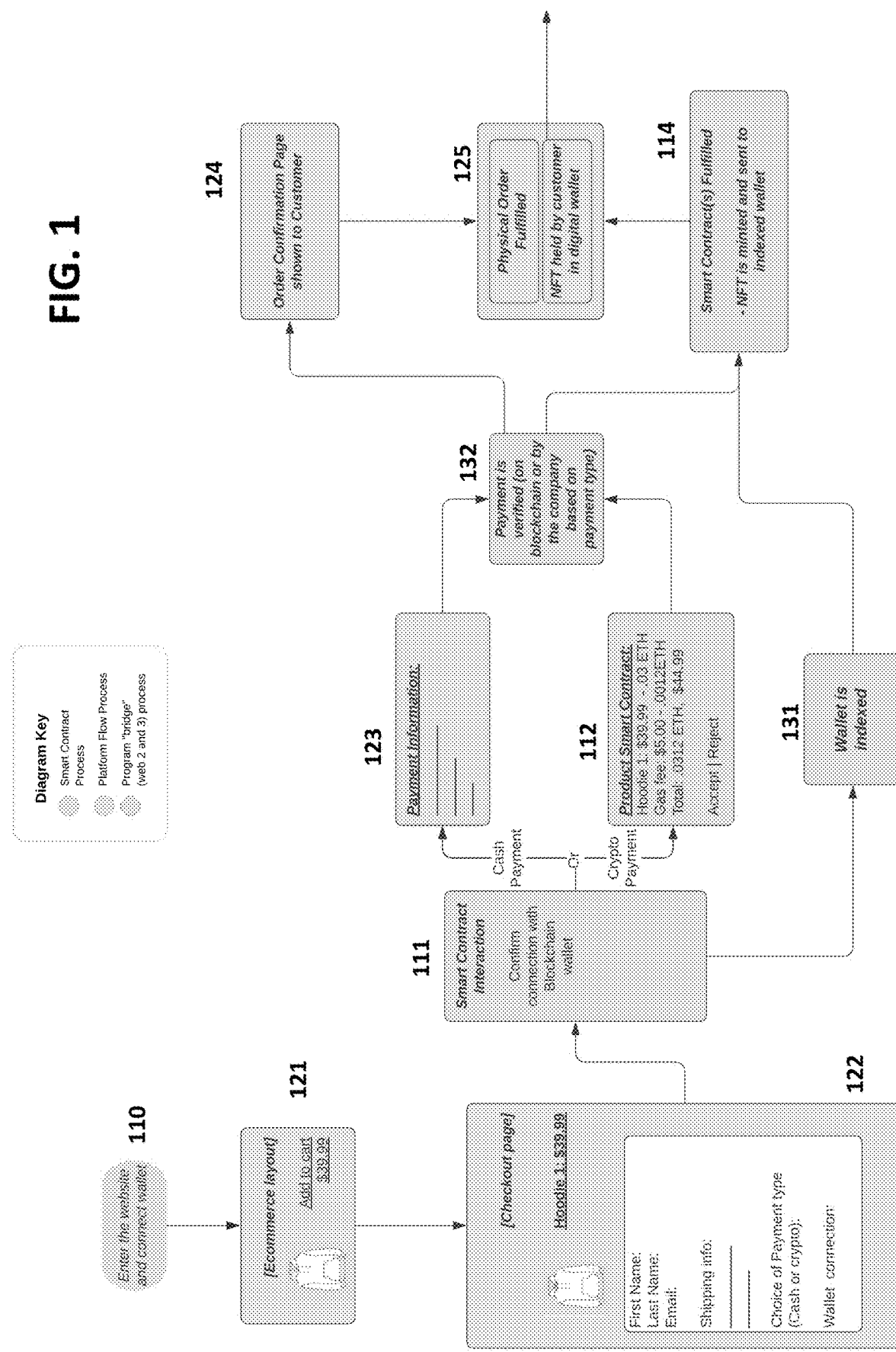
FIG. 1 is a block diagram illustrating an example process flow of a system for automatically linking digital and physical assets at the point of sale.

Various embodiments of the disclosure are discussed in detail below. While specific implementations are discussed, it should be understood that this is done for illustration purposes only. A person skilled in the relevant art will recognize that other components and configurations may be used without departing from the spirit and scope of the disclosure. Additional features and advantages of the disclosure will be set forth in the description which follows, and in part will be obvious from the description, or can be learned by practice of the herein disclosed principles. It will be appreciated that for simplicity and clarity of illustration, where appropriate, reference numerals have been repeated among the different figures to indicate corresponding or analogous elements. The description is not to be considered as limiting the scope of the embodiments described herein.

As mentioned previously, a non-fungible token (NFT) can be provided as a token or unit of data stored on a blockchain or other digital ledger. In some examples, NFTs can be used to certify a digital file to be unique. NFTs can be created by using a blockchain to link (e.g., chain together) records of cryptographic hashes onto previous records, thereby creating a chain of identifiable data blocks. In the context of NFTs, the cryptographic hash can comprise a set of characters that verifies a set of data to be unique. This cryptographic transaction process can be used to ensure the authentication of digital files, assets, etc., by providing a digital signature that can be used to track and/or prove NFT ownership. NFTs can be used to represent various items, which can include, but are not limited to, photos, videos, audio, and other types of digital files. While copies of these digital items may be available for anyone to obtain, NFTs are tracked on blockchains to provide an NFT holder with proof of ownership.

There is a rising interest and demand for NFTs, including NFTs of various art items and other digital assets (e.g., photos, videos, music, drawings, etc.). However, because NFTs are, by their design, non-fungible, NFTs have largely been limited to transactions involving ownership of unique and non-fungible assets and items. For example, NFTs have seen limited adoption in the context of physical retail, which typically involves the sale of identical (e.g., fungible) items at a large scale. More generally, there remain challenges in integrating or otherwise combining NFT-based transactions of digital assets with existing approaches to transactions of physical assets.

Described herein are systems and techniques for automatically linking physical asset transactions and NFT-based digital asset transactions. For example, the systems and techniques can be used to automatically generate one or more NFTs in association with a transaction for physical assets or goods. It is noted that, as used herein, the process of generating an NFT may also be referred to as "minting" an NFT. In some embodiments, the systems and techniques described herein can be utilized with existing retail mechanisms for physical goods, which can include, but are not limited to, websites and other e-commerce platforms that allow users to purchase one or more items out of a selection of items. The systems and techniques can additionally, or alternatively, be implemented in a standalone fashion, wherein digital assets (e.g., NFTs) are paired with physical assets automatically at a single point of sale.

In one illustrative embodiment, an NFT can be automatically generated (e.g., minted) in response to a transaction of physical assets, wherein the NFT represents or is otherwise associated with the transacted physical asset. For example, an NFT can be minted using an image or other representation of the physical asset, as will be described in greater depth below. In some embodiments, the NFT can further function as an immutable digital receipt or record of a transaction in physical goods. For example, an NFT can be automatically minted to include some or all of the transaction information associated with a physical goods transaction.

In existing approaches, NFTs and physical items are typically unlinked. For example, although an individual may be able to acquire a physical item and an NFT of or associated with that physical item, the physical item and the NFT are acquired in two separate transactions. In other words, physical items and NFTs remain inherently separate, regardless of any similarity or association between a physical item and an NFT. Accordingly, it is contemplated herein that NFTs can be automatically minted to provide a link between physical and digital aspects of a transaction.

The disclosure turns now to FIG. 1, which depicts an example schematic representation of a process 100 for automatically generating (e.g., minting) one or more NFTs based on a transaction for physical items. In general, the process 100 can be used to automatically provide customers (e.g., users of the NFT-based platform described herein) with both digital and physical aspects to their purchases of physical goods. The physical aspect of the purchase or transaction can be provided by the physical good that is delivered to the user. For example, in an e-commerce transaction for a sweatshirt, the physical aspect of the transaction is the sweatshirt that is purchased and delivered to the user. In the same example, the digital aspect of the e-commerce transaction can be an automatically minted NFT, where the NFT is automatically minted based on an image (or other digital representation) of the sweatshirt. The NFT can also be automatically minted based at least in part on additional information such as an identity of the user, specific information associated with the e-commerce transaction, etc.

In the example process flow 100 that is depicted in FIG. 1, three sub-processes are illustrated—a smart contract process (indicated by the circles numbered 0-4 and corresponding to reference numerals 110, 111, 112, 113, 114, respectively); a platform flow process (indicated by the hexagons numbered 1-5 and corresponding to reference numerals 121, 122, 123, 124, 125, respectively); and a program "bridge" process (indicated by the triangles numbered 1-2 and corresponding to reference numerals 131, 132, respectively). Each sub-process is associated with one or more steps. For example, the smart contract process is depicted as including steps 0-4; the platform flow process is depicted as including steps 1-5; and the program "bridge" process is depicted as including steps 1-2. The various steps of each sub-process are each described in greater detail below.

Smart Contract—Step (0): At block 110, a user can initially be prompted to connect a digital wallet (also referred to as a cryptocurrency wallet or a crypto wallet) to the presently disclosed service. The digital wallet can be a mobile wallet, a desktop wallet, a hardware wallet, etc. If the user does not have an existing digital wallet, the user can be automatically prompted to create one. An automatically created digital wallet can be automatically connected to the service, either after being created or as part of the wallet creation process. In some embodiments, a user can connect multiple digital wallets, and make a selection between their various connected digital wallets in one or more of the subsequently described steps. The user's digital wallet can be used to hold (e.g., store) keys or other cryptographic information associated with one or more NFTs that will subsequently be minted for (and owned by) the user. The user's digital wallet can additionally be used to hold one or more public and/or private keys that are associated with the user and can be used for purposes of identification, encryption, verification, signing, etc.

In some examples, a user's digital wallet can be used to store the public and/or private keys associated with a given blockchain transaction, can be used to perform a signing function in association with executing a smart contract, etc. In the context of an NFT, the user's digital wallet can store a private key associated with an NFT owned by the user. The NFT exists as a record in the blockchain (e.g., as a transaction recorded in one or more specific blocks), rather than in the digital wallet itself. However, a user who holds the private key associated with an NFT can use the private key to uniquely and unequivocally prove ownership of the NFT. The user can also use the private key to authorize a subsequent transaction, transfer, etc., of the NFT (which, it is noted, can also be viewed as proof of ownership). In light of the observations above, it is noted that in instances where the following discussion makes reference to a user's digital wallet being used to "store" or "hold" an NFT, it is the private key(s) or other cryptographic information associated with the NFT that is stored or held in the digital wallet.

Platform Flow—Step (1): At block 121 (e.g., platform flow step 1), a user can be presented with a user interface of an e-commerce service. For example, a user can view one or more items available for sale. The items available for sale can be physical or digital, and can be unique (e.g., non-fungible) or non-unique (e.g., fungible). In the example depicted in FIG. 1, the user can view and interact with one or more items available for sale via a web2 e-commerce system, although it is noted that other platforms, systems, etc., may also be utilized without departing from the scope of the present disclosure. At block 121 (e.g., platform flow step 1), the user may select one or more desired products for purchase. For example, the user can add one or more selected items to an online cart or other checkout interface of the e-commerce service.

Platform Flow—Step (2): At block 122 (e.g., platform flow step 2), the user initiates a transaction for the item(s) that were selected at block 121 (e.g., in platform flow step 1). For example, the user can initiate a checkout process for items that were placed in the user's cart. As illustrated in the example of FIG. 1, the user's cart can display the selected items for purchase, along with additional transaction information such as an item image, an item name or description, an item price, etc. The user can be prompted to enter user-information for completing the transaction. For example, the user can be prompted to enter his or her name, shipping address, other shipping information, etc.

Although not depicted in FIG. 1, the transaction interface associated with block 122 (e.g., platform flow step 2) can further include one or more payment options or payment information fields that allow the user to select between various payment options, provide their corresponding payment information, etc. For example, in some embodiments a user can select between various different payment options, such as different cryptocurrencies that can be used to purchase the user's selected items. In some examples, the user can pay for their selected items using cryptocurrency stored in the same digital wallet(s) that were connected at block 110

(e.g., in smart contract step 0), as described above. In some cases, the user can be presented with an option to pay via conventional means, such as a credit or debit card, bank transfer, mobile application, etc.

In some embodiments, the transaction interface associated with block 122 (e.g., platform flow step 2) can be associated with or provided by an existing e-commerce system or platform. In such examples, a back end of the existing e-commerce system can be integrated with or connected to the presently disclosed systems and techniques for automatically minting and linking NFTs to transactions for physical items. In some embodiments, the transaction interface associated with block 122 (e.g., platform flow step 2) can be associated with or provided by the presently disclosed systems and techniques for automatically minting and linking NFTs to transactions for physical items.

As illustrated, block 122 (e.g., the platform flow step 2) can be terminated in response to the user selecting a 'BUY NOW' or other user interface option that allows the user to initiate a transaction for their selected items. In response to the user selecting the 'BUY NOW' user interface option or otherwise initiating the transaction, block 123 (e.g., platform flow step 3) and block 111 (e.g., smart contract step 1) can be automatically triggered or initiated. These two steps are described in turn below. It is noted that block 123 (e.g., platform flow step 3) and block 111 (e.g., smart contract step 1) can be performed in parallel or in sequence. In some embodiments, block 123 (e.g., platform flow step 3) and block 111 (e.g., smart contract step 1) can be performed synchronously or asynchronously.

Platform Flow—Step (3): At block 123 (e.g., platform flow step 3), the user can be presented with an order confirmation screen or an order confirmation user interface. As was the case with block 122 (e.g., platform flow step 2), the order confirmation screen can be associated with or provided by an existing e-commerce system, can be associated with or provided by the presently disclosed automatic NFT minting system, or some combination of the two. Although not illustrated in FIG. 1, block 123 (e.g., platform flow step 3) can additionally include generating and transmitting an order confirmation message, such as an email, text message, online record, etc.

In some embodiments, block 123 (e.g., platform flow step 3) can be integrated with the presently disclosed automatic NFT minting system to provide the user with a visual indication (e.g., via one or more user interface elements) of a status associated with the automatic NFT minting process described herein. For example, the order confirmation screen can provide a status indication such as 'Your order is being confirmed on the blockchain,' a time estimate such as 'This confirmation can take up to 10 minutes,' etc.

Smart Contract—Step (1): At block 111 (e.g., smart contract step 1), an initial smart contract interaction is performed. The smart contract associated with both block 111 (e.g., smart contract step 1) and the smart contract process as a whole can be the automatic minting of an NFT associated with or otherwise linked to the physical items transacted in by the user (e.g., the items purchased at block 122/platform flow step 2). In some examples, one or more smart contracts other than the minting of an NFT can also be utilized without departing from the scope of the present disclosure.

In some embodiments, block 111 (e.g., smart contract step 1) can perform one or more initialization steps. For example, block 111 (e.g., smart contract step 1) can confirm a wallet identity (e.g., a wallet address) for the subsequent automatic NFT minting process or transaction. The wallet identity can be the wallet identity of the user's digital wallet that was connected in block 110 (e.g., smart contract step 0). In some examples, the user's wallet identity can be automatically determined, selected, and/or confirmed. For example, a digital wallet connected in block 110 (e.g., smart contract step 0) can be configured as a default wallet for receiving the user's automatically minted NFTs that are linked to physical items that the user transacts in according to one or more aspects of the present disclosure. In some examples, a user can be prompted to select between multiple digital wallets that the user connected in block 110 (e.g., smart contract step 0). For example, during or after their purchase of a selected item, a user can be prompted to select or identify a digital wallet for receiving an NFT that will be automatically minted based on the purchase of the selected item.

As illustrated in FIG. 1, block 111 (e.g., smart contract step 1) can include a 'Dismiss' option or action and can include a 'Sign' option or action. For example, the 'Dismiss' action can correspond to a user rejecting the automatic NFT minting transaction (e.g., if a user dismisses the smart contract interaction, then the transaction for the user's selected items can proceed conventionally, without an NFT being automatically minted). Similarly, the 'Sign' option can correspond to a user accepting the automatic NFT minting transaction. In some examples, selection of the 'Sign' option can be associated with generating a user signature for the smart contract/NFT minting operation. As mentioned previously, signing can be performed based on one or more public and/or private keys (or other cryptographic keys) uniquely associated with the user and stored in the user's connected digital wallet from block 110 (e.g., smart contract step 0).

It is noted that the description above makes reference to a scenario in which a user is presented with the 'Dismiss' and 'Sign' options and makes a manual selection therebetween; in some embodiments, the 'Dismiss' and/or 'Sign' options can be automatically selected, initiated, or otherwise triggered by the systems and techniques described herein (e.g., such that the process is opaque to the user). For example, a user can set or store one or more user preferences indicating a desire to automatically select the 'Dismiss' option, automatically select the 'Sign' option, etc. In some cases, the user preferences can be specified with a greater granularity, for example with rules or conditions specifying when the system should automatically proceed with the 'Sign' option to trigger the minting of an NFT linked to a purchase of a selected item, and when the system should not. In some examples, the user preferences can be specified on the basis of factors such as the type or class of item being purchased, the vendor of the item (e.g., the counterparty to the transaction for the selected items), the purchase price, etc. In some embodiments, a user preference or user selection between the 'Dismiss' and 'Sign' options can be obtained by the e-commerce system (e.g., via the platform flow process). For example, the checkout process described above with respect to block 122 (e.g., platform flow step 2) could include a selectable user option prompting the user 'Automatically generate a linked NFT for this purchase? (Yes/No)".

As illustrated, the block 111 (e.g., smart contract step 1) can be terminated in response to selection or triggering of the 'Dismiss' option or the 'Sign' option. In some embodiments, in response to selection of the 'Dismiss' option at block 111 (e.g., smart contract step 1), the system may skip or omit performing smart contract steps 2-4 (e.g., corresponding to blocks 112-114, respectively) and program "bridge" steps 1-2 (e.g., corresponding to block 131 and 132, respectively). In response to selection of the 'Sign' option, the overall smart contract process can proceed with smart contracts step 2-4 (e.g., blocks 112-114). Additionally, the program "bridge" process can be initiated, e.g., starting at block 131 (e.g., program "bridge" step 1).

The example of FIG. 1 corresponds to a scenario in which the 'Sign' option is selected at block 111 (e.g., smart contract step 1), thereby triggering the overall process flow 100 to perform block 112 (e.g., smart contract step 2) and block 131 (e.g., program "bridge" step 1). These two steps are described in turn below. It is noted that block 112 (e.g., smart contract step 2) and block 131 (e.g., program "bridge" step 1) can be performed in parallel or sequentially, synchronously or asynchronously, etc., without departing from the scope of the present disclosure.

Program "Bridge"—Step (1): At block 131 (e.g., program "bridge" step 1), the user's digital wallet address is indexed. In this context, the user's digital wallet address can be the same as the wallet identity that was previously confirmed in block 111 (e.g., smart contract step 1) (e.g., which can be the same as the wallet identity/address that was registered or connected at block 110 (e.g., smart contract step 0)). In some embodiments, the program "bridge" process can be implemented as a web2 process, a web3 process, or any combination thereof.

Smart Contract—Step (2): At block 112 (e.g., smart contract step 2), a product-specific smart contract interaction can be performed. In some embodiments, a product-specific smart contract interaction can be performed for each selected product that is purchased by a user (e.g., for each product purchased via the platform flow process/platform flow step 2 (e.g., block 122)). For example, as illustrated in the example depicted in FIG. 1, there are two selected products purchased by the user-'XYZ Hoodie' and 'ABC Hoodie.' A separate product-specific smart contract interaction step can be performed for each product, e.g., block 112/smart contract step 2 is associated with the selected product 'XYZ Hoodie' and block 113/smart contract step 3 is associated with the selected product 'ABC Hoodie.' Accordingly, it is noted that the following description, although made with reference to block 112/smart contract step 2 and the selected product 'XYZ Hoodie,' can be applied equally to block 113/smart contract step 3 and the selected product 'ABC Hoodie' without departing from the scope of the present disclosure.

The product-specific smart contract interaction can be performed to provide or generate a smart contract that represents the transaction for the selected product. In other words, the product-specific smart contract can be created as a blockchain transaction or blockchain record of the user's transaction for the selected products purchased at block 122 (e.g., platform flow step 2). In some examples, the product-specific smart contract interaction can be performed to generate a blockchain receipt (e.g., the smart contract record/transaction that is stored in the blockchain) for the transaction for the user's selected product(s).

The product-specific smart contract (also referred to herein as a "blockchain receipt") can augment a traditional email confirmation of the user's purchase (e.g., as may be generated at block 123 (e.g., platform flow step 3)), can replace the traditional email confirmation of the user's purchase, or any combination of the two. For example, the product-specific smart contract can provide an immutable record of the transaction between the seller of the selected products and the user who purchases the selected products. In some embodiments, one or more portions of the product-specific smart contract be used in generating (e.g., minting) an NFT linked to the transaction between the user and the seller of the selected product(s), as will be described in greater depth below.

As illustrated in FIG. 1, the product-specific smart contract interaction can include transaction information for each selected product that is purchased by or transacted in by the user. For example, block 112/smart contract step 2 depicts the product name/descriptor (e.g., 'XYZ Hoodie'), the product price (e.g., '3 ETH'), the gas fee for the transaction (e.g., '0.03 ETH'), and the transaction total (e.g., '3.03 ETH'). Here, 'ETH' can refer to Ethereum, a cryptocurrency platform that functions as a decentralized, open-source blockchain digital ledger that features smart contract functionality. In particular, ether (e.g., ETH) is the cryptocurrency generated (e.g., mined) by Ethereum miners as a reward for computations performed to secure/validate and add new blocks to the blockchain. Ethereum serves as the platform for a variety of different cryptocurrencies and tokens. For example, NFTs can be minted based on one or more smart contracts on the Ethereum blockchain. With respect to the 'Gas Fee' depicted in FIG. 1 as being associated with the product-specific smart contract interactions of block 112/smart contract step 2 and block 113/smart contract step 3, "gas" is an internal transaction pricing mechanism of the Ethereum blockchain, payable in ether, that can be used to mitigate transaction spam and properly allocate (e.g., incentivize) resources on the network. In other words, the gas fee is the pricing value required to successfully conduct a given transaction or execute a given smart contract on the Ethereum blockchain, at a given moment in time.

Returning now to the discussion of the product-specific smart contract interaction depicted in block 112/smart contract step 2 and block 113/smart contract step 3, the product-specific smart contract interaction can further include selectable options of 'Reject' and 'Accept.' These options can correspond to the user rejecting or accepting the smart contract that is generated based on the user's purchase of each of the selected products (e.g., a first smart contract is generated based on the user's purchase of XYZ Hoodie and a second smart contract is generated based on the user's purchase of ABC Hoodie). The selection of the 'Reject' option or the 'Accept' option for each smart contract (e.g., generated for each purchased/selected product) can be performed manually based on a user input, automatically, or any combination thereof.

Program "Bridge"—Step (2): In response to a product-specific smart contract being accepted, and therefore created, via the smart contract process flow (e.g., selection of the 'Accept' option in blocks 112 and 113 (e.g., smart contract steps 2 and 3)), the overall process flow 100 can proceed to block 132 (e.g., program "bridge" step) 2. In other words, blocks 112 and 113 (e.g., smart contract steps 2 and 3) can result in a smart contract being created for each selected item that was purchased by the user. In some examples, after a user accepts a product-specific smart contract, the user can subsequently complete the corresponding transaction (e.g., to purchase the selected product) by sending the agreed upon amount of cryptocurrency to the seller (e.g., the agreed upon amount of cryptocurrency can be the purchase price or 'Total' indicated by the product-specific smart contract). Because each product-specific smart contract establishes an agreement or obligation of the user to pay the seller for the selected products, at block 132 (e.g., program "bridge" step 2), the appropriate blockchain (e.g., the blockchain with which payment is made by the user) can be monitored to verify or obtain confirmation that each product-specific smart contract has been fulfilled. For example, because blockchains can function as public, distributed transaction ledgers, the product-specific smart contracts and the subsequent payment between the user (or more specifically, the user's wallet address) and the seller (or more specifically, the seller's wallet address or other address agreed upon in the product-specific smart contract) may both be publicly visible on the blockchain. In some embodiments, the same blockchain can be used for the product-specific smart contracts, cryptocurrency payment from the user to the seller, and for the automatically minted NFT(s) that are linked to the transaction of the selected product(s).

In some examples, block 132 (e.g., the program "bridge" step 2) can terminate upon successful verification that the product-specific smart contract(s) has been fulfilled (e.g., the user has provided the agreed upon cryptocurrency payment). In some embodiments, block 132 (e.g., program "bridge" step 2) can wait until each product-specific smart contract associated with a larger transaction between the user and the seller has been verified on the blockchain (e.g., if the user purchases multiple products, block 132/program "bridge" step 2 may wait until each of the individual smart contracts generated for the multiple products have been verified on the blockchain). In some examples, block 132/program "bridge" step 2 can proceed in a stepwise manner, wherein block 132/program "bridge" step 2 runs in a dedicated instance that monitors for the completion/verification of each individual smart contract on the blockchain.

In response to the successful verification that a product-specific smart contract has been fulfilled, the overall process 100 can then proceed to block 124/platform flow step 4 (e.g., providing an order confirmation user interface to the user) and block 114/smart contract step 4 (e.g., automatically minting an NFT linked to each transaction or purchase of a product by the user, and sending the newly minted NFT to the user's digital wallet). These two steps are described in turn below. It is noted that block 124/platform flow step 4 and block 114/smart contract step 4 can be performed in parallel or sequentially, synchronously or asynchronously, etc., without departing from the scope of the present disclosure.

Smart Contract—Step (4): At block 114 (e.g., smart contract step 4), each product-specific smart contract is fulfilled and a corresponding NFT is automatically minted based on the selected products that were purchased by the user. As mentioned previously, the automatically minted NFT(s) described herein can be minted based on or using an image, artwork, etc., that represents a particular product purchased by a user. Various examples and additional details of the automatic NFT minting process will be described in greater depth below.

After minting, each NFT can be automatically sent to the user's digital wallet (e.g., using the wallet address that was registered in block 110/smart contract step 0). In some embodiments, when a user purchases multiple items in the platform flow process, the corresponding multiple NFTs that are minted for the products may be automatically sent to the user's digital wallet in individual fashion (e.g., immediately upon minting).

Platform Flow—Step (4): At block 124 (e.g., platform flow step 4), the user can be presented with an order confirmation screen or an order confirmation user interface. As depicted in FIG. 1, block 124/platform flow step 4 can be performed based at least in part on block 132/program "bridge" step 2 verifying on the blockchain that each product-specific smart contract entered into by the user (e.g., for the selected products) has been fulfilled, meaning that payment has been received. The order confirmation screen can provide an email confirmation that the user's purchase/order of the selected items has been received by the seller or by the e-commerce platform. The order confirmation screen can additionally provide a confirmation that the automatically generated NFT(s) linked to the user's transaction and/or linked to the user's selected items has been minted and send to the user's digital wallet.

Platform Flow—Step (5): At block 125 (e.g., platform flow step 5), the example process 100 can terminate with the user's physical order of the selected items being fulfilled by the merchant or vendor (e.g., that listed the items on the e-commerce platform) and with the corresponding NFT(s) for the selected items being provided to and/or stored in the user's digital wallet. In this manner, buyers and sellers of physical goods can automatically be provided with both digital and physical aspects for their transactions in physical goods, wherein the digital and physical aspects are automatically linked via NFT minting and smart contract interactions on the blockchain.

Example Platform Usage Scenarios

Described below are various example usage scenarios for the systems and techniques described herein. It is noted that these example usage scenarios are provided for purposes of example and illustration and are not intended as limiting.

Example One: Established Web2 Physical Item-Based Brand

In a first example scenario, the systems and techniques described herein can be utilized by an established Web2 physical item-based brand, company, etc., with established facilities for producing and distributing various physical goods under the company's existing brand(s). In this first example scenario, the systems and techniques described herein can provide a platform on which the Web2 physical item brand can form or offer what is referred to herein as a "collection." A collection can be a group of physical items currently offered for sale by the Web2 brand, wherein the physical items are paired to one or more NFTs (e.g., which can be generated as described above with respect to FIG. 1). The NFTs can be minted using images, artwork, etc., of the Web2 brand's own design.

In some embodiments, an established Web2 physical item brand can use the systems and techniques described herein to pair a digital asset (e.g., automatically minted NFTs) to a physical asset (e.g., their branded goods), wherein the pair is performed automatically at the point and/or time of sale. In some examples, this can provide a streamlined and easy entrance point for Web2 brands and companies to enter the Web3 space.

In some embodiments, the systems and techniques can additionally provide an exchange for holders of the automatically minted NFTs and/or owners of the corresponding physical assets to safely trade and exchange items. In some examples, NFT holders can trade, exchange, sell, etc., the NFTs for some initial period of time. At the conclusion of the initial period, a snapshot can be taken noting which digital wallets hold which particular NFTs. The snapshot can be generated based on the blockchain ledger.

In some examples, sellers can use one or more snapshots to determine one or more digital wallets that hold an NFT associated with one of the seller's products. This snapshot information can be automatically collected or determined at some pre-defined interval, can be manually collected in response to a request or input from a particular seller, etc. In some examples, the snapshot information can be used by a seller or brand to provide added value to the holders of the NFTs that were minted based on the brand's (or the seller's) products. It is noted that the holder of an NFT automatically minted for a given product can be the same as the owner of the corresponding physical asset. However, the NFT holder and physical asset owner can also be different individuals or entities (e.g., when the NFT is traded or transferred and/or when the physical asset is traded or transferred), as will be described in greater depth below.

Notably, in some cases sellers can use snapshots to monitor which wallets hold the NFTs of their products and/or brand(s). Sellers and brands can, by proxy, more closely interact with the individuals who hold such a product and for a longer period of time than in conventional solutions. For example, sellers and brands can use the blockchain snapshots and identified digital wallet addresses to offer reinvestment opportunities, exclusive circumstances for holding, etc.

In some embodiments, one or more community building aspects such as a private online community/network, a private or dedicated chat room or chat service, etc., can be attached to or integrated with each NFT-physical product collection that is offered by a brand or seller on the presently disclosed platform (e.g., such as the platform associated with FIG. 1). For example, a seller or brand can attach official links to each of their collections, be provided with advising services on how to being a Web3 community, and/or can attach official links to a Web2 confirmation email, etc.

Example Two: Established Web3 NFT-Based Brand

In a second example scenario, the systems and techniques described herein can be utilized by an established Web3 NFT-based brand, company, etc., that does not have established facilities for producing and distributing physical goods, but does have its own art/design team and/or an established community following (e.g., established brand awareness). In one illustrative example, an established Web3 NFT-based brand can use the presently disclosed systems and techniques to adapt a new sub-project that derives from the Web3 NFT-based brand's art style.

For instance, the Web3 NFT-based brand can form a collection on the platform described herein, wherein the collection pairs their art and/or brand to physical items of their own design, in a tradable space. In this example, the ability to automatically pair a digital asset such as an NFT to a physical asset, wherein the pairing is automatically performed at the point of sale, can provide a streamlined and efficient way for established Web3 brands to reach a larger Web2 audience (e.g., via the paired physical assets) and to expand into physical goods (e.g., in instances where the established Web3 brand previously transacted only in digital assets, NFTs, etc.).

Similar to as was described above with respect to the first example scenario, the presently disclosed platform can provide an exchange for holders of the Web3 brands new NFTs (e.g., that are minted in association with the collection established on the disclosed platform). Using this exchange, holders of the new NFT and/or the corresponding physical assets can safely trade and exchange items. In some cases, enabling the exchange of these digital and physical assets can be an optional feature configurable on the platform by the Web3 NFT-based brand, which can allow the collection to transcend its original point of sale.

In many cases, existing Web3 brands have created merchandise or other physical goods that they sell in association with their brand, art, NFTs, etc. However, in these existing approaches, the brand's NFTs and digital assets are entirely separate from any merchandise or physical goods that are created—there is no link between the digital and physical asset beyond their surface-level visual similarity. In other words, there is no intrinsic or inherent link created between the digital and physical asset, as is created by the presently disclosed automatic product-specific NFT minting platform. Accordingly, Web3 brands can use the systems and techniques described herein to provide a unique user experience in which their known digital assets, brand, art, etc., are conjoined to a matching physical object. For example, the conjoined and matching physical object can be manufactured to contain or include a visual depiction of the artwork underlying a given NFT (e.g., the NFT artwork can be printed on an item of clothing, on a physical good or object, etc.) and then shipped to either the NFT holder or some other individual designated by the NFT holder.

Example Three: Unestablished Brand or Individual

In a third example scenario, the systems and techniques described herein can be utilized by an unestablished brand or individual who would like to create their own collection. For example, an unestablished brand or individual may want to create their own collection and use it as a liaison to a customer pool, user base, etc.

For instance, individuals and/or upcoming brands and projects can use the presently disclosed platform to create one or more collections of physical items that are paired with blockchain/NFTs, as has been described above with respect to FIG. 1 and the previous examples. Notably, the presently disclosed platform can bind Web2 and Web3 to offer unestablished brands and individuals more creative freedom and opportunity to grow their brand(s), product(s), and/or creative expression, etc.

In some embodiments, unestablished brands and individuals can utilize the presently disclosed platform to perform some, or all, of the actions that were described above with respect to the first example scenario and/or the second example scenario. In some cases, the unestablished brands and individuals can additionally utilize the presently disclosed platform for automatic management of physical product manufacturing. It is further contemplated that one or more other related or inter-related services can also be offered by the presently disclosed platform, without departing from the scope of the present disclosure. For example, in addition to offering in-house physical item production/manufacturing and management thereof, the platform can additionally include brand-building, management, and/or analytics, etc., features.

In some embodiments, the systems and techniques described herein can be utilized to perform any combination of the example scenarios described above. For example, the presently disclosed platform could also be utilized by an established Web3 brand that has its own manufacturing and distribution facilities, with the platform used to provide the automatic and inherent linkage between digital assets (NFTs) and physical assets manufactured by the established Web3 brand.

Example Release/Drop Scenarios

Described below are various example release/drop scenarios for the digital assets and/or physical assets associated with the presently disclosed platform. It is noted that these example release/drop scenarios are provided for purposes of example and illustration and are not intended as limiting.

Drop Scenario One: Collection of Identical Products

In one illustrative embodiment, it is contemplated that a seller provides a collection (e.g., using the presently disclosed platform) that shows the buyer the product. The products themselves can be identical and therefore repeatable to demand, but the design can slightly differ in order to provide uniqueness (e.g., recalling that each minted NFT is unique).

For example, at the moment of sale a buyer can receive a unique NFT and confirmation for their order of a selected product. The buyer can choose to exchange or hold the NFT at their discretion. The design for the NFT can be obtained from a larger image or design. In order to provide the aforementioned uniqueness, the design for each NFT can be obtained or generated as either a unique angle or a unique portion of the larger image/design. For example, if the larger image or design used for the NFTs is an image or 3D modeled picture, each individual NFT can be minted as a slightly different angle of the underlying/original 3D model. In some cases, such an approach may be seen to provide a more uniform application to a collection while allowing a large number of linked physical products to be sold (and while allowing individuals to pick and choose from a variety of physical products, per their own purchasing preferences, like in a conventional Web2 online/e-commerce storefront).

In some embodiments, the systems and techniques described herein can include a user interface that shows a selected product along with the larger image that it is derived from. For example, from this user interface a user can make a decision to purchase or not to purchase. If a decision to purchase is made, the user can add the product to their online cart and proceed to the checkout process with the conjoined Web2 and Web3 aspects (e.g., the user can proceed to the checkout process at block 122 (e.g., platform flow step 2) as described above with respect to the example overall process flow 100 illustrated in FIG. 1).

Upon completing the checkout or transaction process, a user or buyer can automatically receive an automatically minted NFT that is product-specific (e.g., the automatically minted NFT corresponds to a selected item that was purchased by the user). For example, the user can receive the automatically minted product specific NFT as has been described previously above, wherein the user receives their NFT showing the specific angle or section of the print/underlying artwork on their selected item. The user receives the corresponding physical item once it is processed (e.g., manufactured) and shipped. In some aspects, the approach described herein and above can be used to provide unique assets to NFT holders, wherein the seller can choose the quantity or quantities of each. Moreover, users can be automatically connected to the benefits of a blockchain-connected consumer base.

In some embodiments, the systems and techniques described herein can additionally, or alternatively, be utilized in combination with unique artworks (e.g., rather than being utilized with portions of a single unique artwork). In other words, it is contemplated that the multiple NFTs can be automatically minted for unique portions of a single overall artwork, or that a single NFT can be automatically minted for each single overall artwork. In some examples, when single NFTs are minted for a piece of artwork, examples of the art that a buyer could receive can be displayed on a purchase page of an e-commerce interface and/or through a brand or artist's existing social media and/or marketing ventures, etc. (e.g., described in greater depth below with respect to the example drop scenario three).

Drop Scenario Two: Integration of the Platform into a Seller's Existing Website UI In the second drop scenario, a seller can integrate or implement the systems and techniques described herein into their existing website and/or e-commerce user interface (UI). For example, in exchange for the presently disclosed platform, which blends Web2 and Web3 commerce and transactional techniques, a commission or processing fee can be taken out of each transaction that is processed on the seller's existing website UI that integrated the presently disclosed platform.

In such examples, a seller can implement their e-commerce or selling UI as desired. Additionally, such sellers can also choose between some or all of the scenarios described above to implement or otherwise offer for use on their e-commerce or existing website. For example, by integrating the presently disclosed platform onto an existing website or e-commerce system, sellers can advantageously gain the ability to simultaneously provide buyers with a product-specific NFT and a conventional (e.g., Web2) order confirmation for each item purchased, for each transaction, etc.

Drop Scenario Three: NFT Art Immediately Revealed at Point of Sale, No Swapping

In another example, sellers can implement the automatic NFT minting process described herein by immediately revealing the art that will be used to mint the NFTs. In particular, the art can be immediately revealed at the point of sale. The individuals who originally purchase (e.g., mint) the piece will be shipped the physical item, regardless of whether or not the individual later sells or transfers the NFT. In other words, physical item ownership is conferred based on the NET minting, rather than holding the NFT at some specified moment in time.

In some embodiments, the platform interface can depict multiple examples of the project (e.g., collection) and the product(s) that will be received. A user can add desired products to their cart and checkout via the combined Web2 and Web3 process previously described above (e.g., beginning at block 122 (e.g., platform flow step 2) of the overall process flow 100 illustrated in FIG. 1).

In some embodiments, at the moment an item is purchased, a random piece from the collection can be added to the user's wallet in the form of an NFT, while an order is simultaneously placed for a physical item with the design printed or otherwise included on the product attached to the digital wallet/account's NFT that was received. The piece received by a user can be noted at the moment of the piece's mint—this can be the physical item or the design on the physical item that the user will receive once the order is fulfilled.

In some embodiments, the NFTs described herein can be traded in the aftermarket. Aftermarket NFT trading can be performed using an exchange integrated with or provided by the presently disclosed system (e.g., as described previously). In some cases, the NFTs described herein can additionally, or alternatively, be traded in the aftermarket based on a user connecting his or her digital wallet to an external NFT exchange and trading one or more NFTs on that external exchange. It is further noted that the physical items can additionally be traded, transferred, resold, etc., once they are received by the user, e.g., at the user's discretion.

Drop Scenario Four: NET Art Immediately Revealed at Point of Sale, Swapping Allowed In another example, sellers can implement the automatic NFT minting process described herein by immediately revealing the art at the point of sale, while allowing users to swap, trade, exchange, etc., the NFTs for a given period of time. At the conclusion of the given period of time, a snapshot can be taken to establish the holders of each of the NFTs. The snapshot can identify the NFT holders based on the public ledger records on the blockchain.

In particular, this drop scenario can be similar to the drop scenario three described above, with the modification of users being permitted to trade, for a limited period of time, the NFT(s) gained immediately in their digital wallets after completing a purchase. The limited period of trading time can be specified by the seller. At the end of the trading period, the snapshot can be taken to identify the digital addresses that hold each NFT at that moment in time. Based on holding a given NFT at the end of the trading period, the corresponding user of the digital wallet can be sent the physical product or asset that is associated with each of the NFTs they hold. In some embodiments, after the conclusion of the initial trading period, the NFTs can continue to be traded. In some examples, future value can be added by the seller as desired (e.g., again based on snapshot determinations of the digital wallets or addresses that hold various ones of the NFTs at a particular moment in time).

Drop Scenario Five: NFT Art Temporarily Remains Unrevealed, Swapping Allowed

In another example, sellers can implement the automatic NFT minting process described herein by leaving the NFT art temporarily unrevealed. In particular, sellers can leave the art unrevealed for a pre-determined period of time, while still allowing swapping and trading to occur between users (e.g., as described above, but without the art of each NFT being known or revealed at the time of the swap(s) or trade(s)). Subsequently, the art is then revealed.

Upon the art being revealed, in some embodiments an additional, follow-on swap or trading period can occur, with a snapshot taken at the conclusion of the follow-on period and the corresponding physical assets then distributed to the appropriate NFT holders as described above. In some embodiments, a snapshot can be immediately taken upon the art being revealed, with no follow-on swap or trading period being offered. In this example, the corresponding physical assets are distributed to the NFT holders as determined at the moment the art is revealed. In either case, the snapshot is used to determine the particular digital wallets/addresses that hold each NFT, and the user associated with that wallet/address is then shipped their respective physical item(s).

Figure 2:
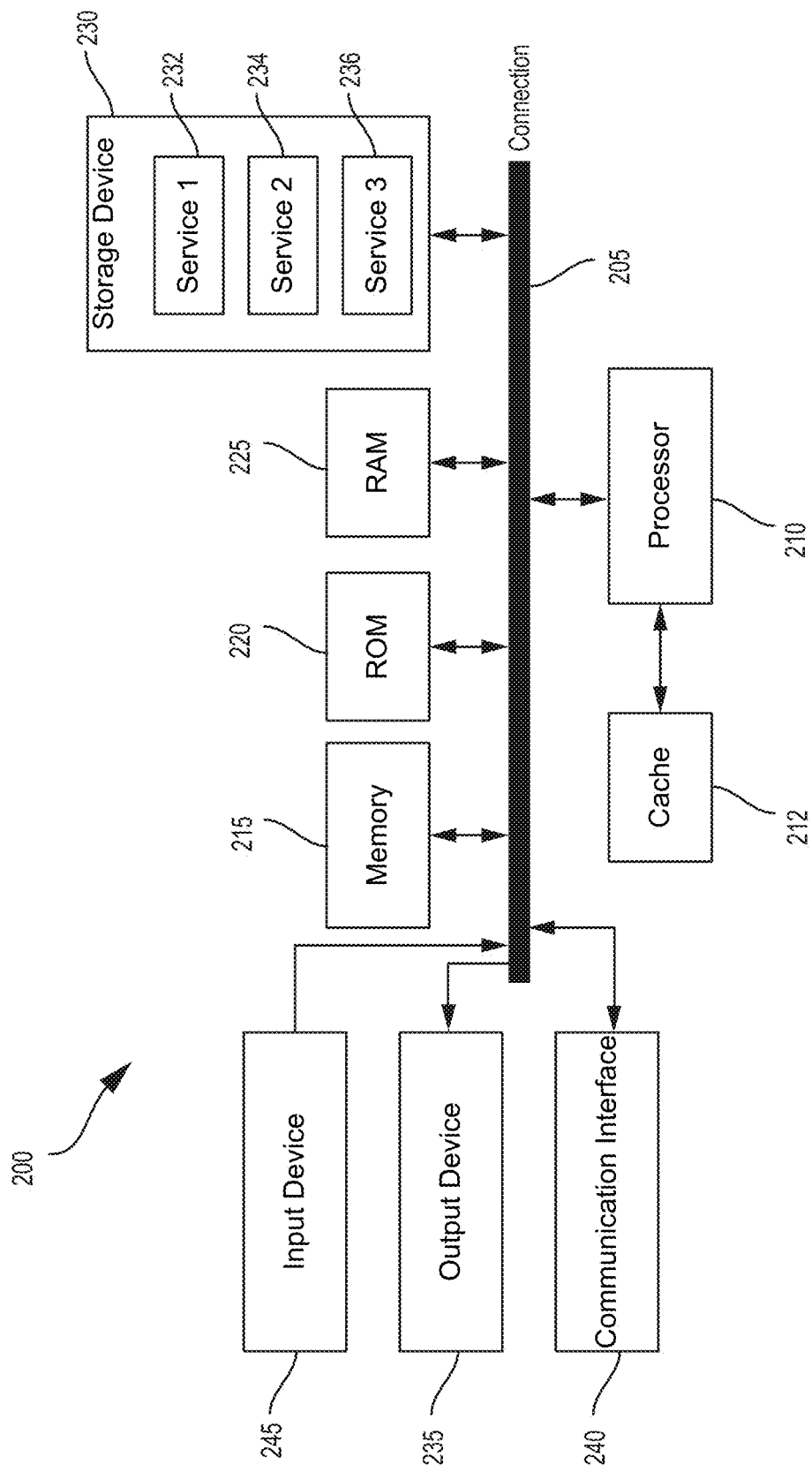
FIG. 2 is a block diagram illustrating an example of a computing system for implementing certain aspects described herein.

FIG. 2 illustrates an example computing device architecture 200 of an example computing device which can implement the various techniques described herein. In some examples, the computing device can include a mobile device, a wearable device, an extended reality device (e.g., a virtual reality (VR) device, an augmented reality (AR) device, or a mixed reality (MR) device), a personal computer, a laptop computer, a video server, a vehicle (or computing device of a vehicle), or other device. The components of computing device architecture 200 are shown in electrical communication with each other using connection 205, such as a bus. The example computing device architecture 200 includes a processing unit (CPU or processor) 210 and computing device connection 205 that couples various computing device components including computing device memory 215, such as read only memory (ROM) 220 and random-access memory (RAM) 225, to processor 210.

Computing device architecture 200 can include a cache of high-speed memory connected directly with, in close proximity to, or integrated as part of processor 210. Computing device architecture 200 can copy data from memory 215 and/or the storage device 230 to cache 212 for quick access by processor 210. In this way, the cache can provide a performance boost that avoids processor 210 delays while waiting for data. These and other engines can control or be configured to control processor 210 to perform various actions. Other computing device memory 215 may be available for use as well. Memory 215 can include multiple different types of memory with different performance characteristics. Processor 210 can include any general-purpose processor and a hardware or software service, such as service 1 232, service 2 234, and service 3 236 stored in storage device 230, configured to control processor 210 as well as a special-purpose processor where software instructions are incorporated into the processor design. Processor 210 may be a self-contained system, containing multiple cores or processors, a bus, memory controller, cache, etc. A multi-core processor may be symmetric or asymmetric.

To enable user interaction with the computing device architecture 200, input device 245 can represent any number of input mechanisms, such as a microphone for speech, a touch-sensitive screen for gesture or graphical input, keyboard, mouse, motion input, speech and so forth. Output device 235 can also be one or more of a number of output mechanisms known to those of skill in the art, such as a display, projector, television, speaker device, etc. In some instances, multimodal computing devices can enable a user to provide multiple types of input to communicate with computing device architecture 200. Communication interface 240 can generally govern and manage the user input and computing device output. There is no restriction on operating on any particular hardware arrangement and therefore the basic features here may easily be substituted for improved hardware or firmware arrangements as they are developed.

Storage device 230 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 225, read only memory (ROM) 220, and hybrids thereof. Storage device 230 can include services 232, 234, 236 for controlling processor 210. Other hardware or software modules or engines are contemplated. Storage device 230 can be connected to the computing device connection 205. In one aspect, a hardware module that performs a particular function can include the software component stored in a computer-readable medium in connection with the necessary hardware components, such as processor 210, connection 205, output device 235, and so forth, to carry out the function.

Aspects of the present disclosure are applicable to any suitable electronic device (such as smartphones, tablets, laptop computers, or other devices). The term "device" is not limited to one or a specific number of physical objects (such as one smartphone, one controller, one processing system and so on). As used herein, a device may be any electronic device with one or more parts that may implement at least some portions of this disclosure. While the below description and examples use the term "device" to describe various aspects of this disclosure, the term "device" is not limited to a specific configuration, type, or number of objects. Additionally, the term "system" is not limited to multiple components or specific aspects. For example, a system may be implemented on one or more printed circuit boards or other substrates and may have movable or static components. While the below description and examples use the term "system" to describe various aspects of this disclosure, the term "system" is not limited to a specific configuration, type, or number of objects.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, an engine, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, engines, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, engines, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random-access memory (SDRAM), read-only memory (ROM), non-volatile random-access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative Aspects of the disclosure include:

Aspect 1. A method comprising: obtaining transaction information of at least a first selected item associated with an online transaction between a user device and a provider system, wherein the transaction information includes at least a user identifier of a user of the user device and is obtained over a communication network; determining a digital wallet address associated with the user based at least in part on the user identifier, wherein the digital wallet address is associated with a digital wallet system identified from among a plurality of available digital wallet systems; automatically generating a non-fungible token (NFT) based on the transaction information, wherein the NFT is automatically generated in response to verifying the online transaction for the first selected item; and providing information regarding the NFT to the digital wallet system in accordance with the digital wallet address associated with the user, wherein the digital wallet system updates information stored at the digital wallet address based on the information regarding the NFT.

Aspect 2. The method of Aspect 1, wherein providing the information regarding the NFT to the digital wallet system comprises: transmitting the NFT to the digital wallet address associated with the user, wherein information associated with transmitting the NFT to the digital wallet address is written to a blockchain associated with the digital wallet system.

Aspect 3. The method of any of Aspects 1 to 2, wherein determining the digital wallet address associated with the user comprises: determining that no digital wallet address is currently associated with the user, based at least in part on the user identifier; and in response to the determining, generating a digital wallet for the user, the generated digital wallet having the digital wallet address.

Aspect 4. The method of any of Aspects 1 to 3, further comprising: prompting the user to provide a user input indicative of the digital wallet address associated with the user; and storing the digital wallet address in association with the user identifier.

Aspect 5. The method of Aspect 4, wherein determining the digital wallet address associated with the user comprises: utilizing the user identifier as a query into a plurality of stored digital wallet addresses; and obtaining the digital wallet address associated to the user identifier query.

Aspect 6. The method of any of Aspects 1 to 5, wherein: the online transaction is between the user device and a web2 e-commerce system or a web3 e-commerce system.

Aspect 7. The method of any of Aspects 1 to 6, wherein the first selected item associated with the online transaction is different from the automatically generated NFT.

Aspect 8. The method of any of Aspects 1 to 7, wherein verifying the online transaction for the first selected item includes: obtaining information indicative of a payment transmitted from the user device to the provider system; and based on the information indicative of the payment transmitted from the user device, confirming receipt of the transmitted payment by the provider system.

Aspect 9. The method of Aspect 8, wherein: the information indicative of the payment is blockchain transaction information stored on a blockchain associated with the digital wallet system, and wherein the payment is a cryptocurrency payment transmitted from the digital wallet address associated with the user to a second digital wallet address associated with the provider system; and confirming receipt of the transmitted payment comprises determining that the blockchain transaction information has been confirmed on the blockchain.

Aspect 10. The method of any of Aspects 1 to 9, further comprising: generating a smart contract on a blockchain associated with the digital wallet system, wherein the smart contract combines the transaction information of the first selected item of the online transaction with minting information for automatically generating the NFT based on the transaction information.

Aspect 11. The method of Aspect 10, wherein the smart contract links the first selected item with the automatically generated NFT.

Aspect 12. The method of any of Aspects 10 to 11, wherein generating the smart contract includes initializing the smart contract based on the digital wallet address associated with the user.

Aspect 13. The method of any of Aspects 10 to 12, further comprising: obtaining a user input indicative of a cryptographic signature associated with the digital wallet address of the user, wherein the cryptographic signature corresponds to the user signing the smart contract; and automatically generating the NFT based on verifying the transaction information for the first selected item and based on verifying the cryptographic signature associated with the digital wallet address of the user.

Aspect 14. An apparatus comprising: at least one memory comprising instructions; and at least one processor configured to execute the instructions and cause the apparatus to: obtain transaction information of at least a first selected item associated with an online transaction between a user device and a provider system, wherein the transaction information includes at least a user identifier of a user of the user device and is obtained over a communication network; determine a digital wallet address associated with the user based at least in part on the user identifier, wherein the digital wallet address is associated with a digital wallet system identified from among a plurality of available digital wallet systems; automatically generate a non-fungible token (NFT) based on the transaction information, wherein the NFT is automatically generated in response to verifying the online transaction for the first selected item; and provide information regarding the NFT to the digital wallet system in accordance with the digital wallet address associated with the user, wherein the digital wallet system updates information stored at the digital wallet address based on the information regarding the NFT.

Aspect 15. The apparatus of Aspect 14, wherein, to provide the information regarding the NFT to the digital wallet system, the at least one processor is configured to: transmit the NFT to the digital wallet address associated with the user, wherein information associated with transmitting the NFT to the digital wallet address is written to a blockchain associated with the digital wallet system.

Aspect 16. The apparatus of any of Aspects 14 to 15, wherein, to determine the digital wallet address associated with the use, the at least one processor is configured to: determine that no digital wallet address is currently associated with the user, based at least in part on the user identifier; and generate a digital wallet for the user, the generated digital wallet having the digital wallet address.

Aspect 17. The apparatus of any of Aspects 14 to 16, wherein: the online transaction is between the user device and a web2 e-commerce system or a web3 e-commerce system; and the first selected item associated with the online transaction is different from the automatically generated NFT.

Aspect 18. The apparatus of any of Aspects 14 to 17, wherein, to verify the online transaction for the first selected item, the at least one processor is configured to: obtain information indicative of a payment transmitted from the user device to the provider system, wherein the information indicative of the payment is blockchain transaction information stored on a blockchain associated with the digital wallet system, and wherein the payment is a cryptocurrency payment transmitted from the digital wallet address associated with the user to a second digital wallet address associated with the provider system; and based on the information indicative of the payment transmitted from the user device, confirm receipt of the transmitted payment by the provider system based on determining that the blockchain transaction information has been confirmed on the blockchain.

Aspect 19. The apparatus of any of Aspects 14 to 18, wherein the at least one processor is further configured to: generate a smart contract on a blockchain associated with the digital wallet system, wherein the smart contract combines the transaction information of the first selected item of the online transaction with minting information for automatically generating the NFT based on the transaction information, wherein the smart contract links the first selected item with the automatically generated NFT, and wherein, to generate the smart contract, the at least one processor is configured to initialize the smart contract based on the digital wallet address associated with the user.

Aspect 20. The apparatus of any of Aspects 18 to 19, wherein the at least one processor is further configured to: obtain a user input indicative of a cryptographic signature associated with the digital wallet address of the user, wherein the cryptographic signature corresponds to the user signing the smart contract; and automatically generate the NFT based on verifying the transaction information for the first selected item and based on verifying the cryptographic signature associated with the digital wallet address of the user.

Aspect 21. A non-transitory computer-readable medium comprising instructions that, when executed by an apparatus, cause the apparatus to perform operations in accordance with any one of Aspects 1 to 13.

Aspect 22. A non-transitory computer-readable medium comprising instructions that, when executed by an apparatus, cause the apparatus to perform operations in accordance with any one of Aspects 14 to 20.

Aspect 23. An apparatus comprising means for performing operations in accordance with any one of Aspects 1 to 13.

Aspect 24. An apparatus comprising means for performing operations in accordance with any one of Aspects 14 to 20.

What is claimed is:

1. A method for pairing assets to non-fungible tokens, the method comprising:
    obtaining transaction information of at least a first selected item associated with an online transaction between a user device and a provider system, wherein the transaction information includes at least a user identifier of a user of the user device and is obtained over a communication network;
    determining a digital wallet address associated with the user based at least in part on the user identifier, wherein the digital wallet address is associated with a digital wallet system identified from among a plurality of available digital wallet systems;
    verifying a cryptographic signature associated with the digital wallet address;
    determining that the transaction information meets one or more conditions specified by one or more user preferences, wherein the conditions specified by the user preferences include at least one of a type of the first selected item, a vendor of the first selected item, and a purchase price of the first selected item;
    automatically selecting an option to trigger generation of a non-fungible token (NFT) based on the verified cryptographic signature and the determination that the transaction information meets the conditions specified by the user preferences; and
    providing information regarding the NFT to the digital wallet system in accordance with the digital wallet address associated with the user, wherein the digital wallet system updates information stored at the digital wallet address based on the information regarding the NFT.

2. The method of claim 1, wherein providing the information regarding the NFT to the digital wallet system includes transmitting the NFT itself to the digital wallet address associated with the user, wherein information associated with transmitting the NFT to the digital wallet address is written to a blockchain associated with the digital wallet system.

3. The method of claim 1, wherein determining the digital wallet address associated with the user includes:
    determining that no digital wallet address is currently associated with the user based at least in part on the user identifier; and
    generating a digital wallet having the digital wallet address based on the determination that no digital wallet address is currently associated with the user.

4. The method of claim 1, further comprising:
    generating a prompt for input indicative of the digital wallet address associated with the user; and
    storing the digital wallet address in association with the user identifier.

5. The method of claim 4, wherein determining the digital wallet address associated with the user includes:
    utilizing the user identifier to query into a plurality of stored digital wallet addresses; and
    obtaining the digital wallet address in response to the query.

6. The method of claim 1, wherein the online transaction is between the user device and a web2 e-commerce system or a web3 e-commerce system.

7. The method of claim 1, wherein the first selected item associated with the online transaction is different from the generated NFT.

8. The method of claim 1, further comprising verifying the online transaction for the first selected item by:
    obtaining information indicative of a payment transmitted from the user device to the provider system; and
    confirming receipt of the transmitted payment by the provider system based on the information indicative of the payment transmitted from the user device.

9. The method of claim 8, wherein the information indicative of the payment is blockchain transaction information stored on a blockchain associated with the digital wallet system, wherein the payment is a cryptocurrency payment transmitted from the digital wallet address associated with the user to a second digital wallet address associated with the provider system, and wherein confirming receipt of the transmitted payment includes determining that the blockchain transaction information has been confirmed on the blockchain.

10. The method of claim 1, further comprising:
    generating a smart contract on a blockchain associated with the digital wallet system, wherein the smart contract combines the transaction information of the first selected item of the online transaction with minting information for generating the NFT based on the verified cryptographic signature and the transaction information.

11. The method of claim 10, wherein the smart contract links the first selected item with the generated NFT.

12. The method of claim 10, wherein generating the smart contract includes initializing the smart contract based on the digital wallet address associated with the user.

13. The method of claim 10, further comprising obtaining a user input indicative of the cryptographic signature associated with the digital wallet address of the user, wherein the cryptographic signature corresponds to the user signing the smart contract.

14. The method of claim 1, wherein the cryptographic signature is generated based on one or more options selected from a display presented through a user interface.

15. The method of claim 14, further comprising receiving one or more selections of the options based on manual input at the user device.

16. The method of claim 1, further comprising generating a prompt for input regarding the one or more user preferences, the prompt presented at the user device through an e-commerce system during the online transaction.

17. The method of claim 10, wherein the minting information includes a portion of an image or a 3D-modeled picture of the first selected item, and further comprising automatically linking information regarding the first selected item and the minting information at a point in time of the online transaction.

18. The method of claim 1, further comprising:
    generating a mapping of digital wallet addresses from a blockchain ledger at a pre-defined time interval; and
    identifying respective NFTs held at the digital wallet addresses to monitor which NFT is held at which digital wallet address.

19. An apparatus for pairing assets to non-fungible tokens, the apparatus comprising:
    at least one memory comprising instructions; and
    at least one processor configured to execute the instructions and cause the apparatus to:
        obtain transaction information of at least a first selected item associated with an online transaction between a user device and a provider system, wherein the transaction information includes at least a user identifier of a user of the user device and is obtained over a communication network;

determine a digital wallet address associated with the user based at least in part on the user identifier, wherein the digital wallet address is associated with a digital wallet system identified from among a plurality of available digital wallet systems;

verify a cryptographic signature associated with the digital wallet address;

determine that the transaction information meets one or more conditions specified by one or more user preferences, wherein the one or more user preferences specify at least one of a type of the first selected item, a vendor of the first selected item, and a purchase price of the first selected item;

automatically select an option to trigger generation of a non-fungible token (NFT) based on the verified cryptographic signature and the determination that the transaction information meets the conditions specified by the user preferences; and provide information regarding the NFT to the digital wallet system in accordance with the digital wallet address associated with the user, wherein the digital wallet system updates information stored at the digital wallet address based on the information regarding the NFT.

20. The apparatus of claim 19, wherein the at least one processor executes further instructions to:

generate a smart contract on a blockchain associated with the digital wallet system, wherein the smart contract combines the transaction information of the first selected item of the online transaction with minting information for generating the NFT based on the verified cryptographic signature and the transaction information, wherein the smart contract links the first selected item with the generated NFT; and initialize the smart contract based on the digital wallet address associated with the user.

* * * * *